United States Patent
Fukuzawa et al.

(10) Patent No.: US 6,891,790 B2
(45) Date of Patent: May 10, 2005

(54) OPTICAL RECORDING MEDIUM, OPTICAL RECORDING DEVICE AND OPTICAL RECORDING METHOD

(75) Inventors: Narutoshi Fukuzawa, Tokyo (JP); Syuji Tsukamoto, Tokyo (JP)

(73) Assignee: TDK Corporation, Tokyo (JP)

( * ) Notice: Subject to any disclaimer, the term of this patent is extended or adjusted under 35 U.S.C. 154(b) by 400 days.

(21) Appl. No.: 10/103,688

(22) Filed: Mar. 25, 2002

(65) Prior Publication Data

US 2002/0191519 A1 Dec. 19, 2002

(30) Foreign Application Priority Data

Mar. 28, 2001 (JP) .......................................... 2001-093941

(51) Int. Cl.⁷ .................................................. G11B 7/00
(52) U.S. Cl. ................................................... 369/59.12
(58) Field of Search .......................... 369/59.11, 59.12, 369/116, 47.5, 276.2

(56) References Cited

U.S. PATENT DOCUMENTS

| 4,998,237 A | * | 3/1991 | Osakabe et al. | 369/59.12 |
| 5,499,227 A | * | 3/1996 | Higasa | 369/59.12 |
| 5,513,167 A | * | 4/1996 | Udagawa et al. | 369/59.12 |
| 5,583,838 A | * | 12/1996 | Itoh | 369/47.31 |
| 6,137,755 A | * | 10/2000 | Bakx et al. | 369/44.34 |
| 6,160,784 A | * | 12/2000 | Maeda et al. | 369/116 |
| 6,222,814 B1 | * | 4/2001 | Ichimura | 369/116 |
| 6,504,806 B1 | * | 1/2003 | Nakajo | 369/59.12 |
| 6,611,484 B2 | * | 8/2003 | Tsukamoto | 369/59.11 |
| 6,631,110 B1 | * | 10/2003 | Seo et al. | 369/59.12 |
| 6,650,607 B1 | * | 11/2003 | Kando et al. | 369/59.24 |
| 6,699,557 B2 | * | 3/2004 | Arioka et al. | 369/275.4 |

OTHER PUBLICATIONS

DVD Specifications for Recordable Disc (DVD–R), Part 1–Physical Specifications, Version 1.0; Jul. 1997.

* cited by examiner

Primary Examiner—Thang V. Tran
(74) Attorney, Agent, or Firm—Oliff & Berridge, PLC

(57) ABSTRACT

A laser beam is directed to an optical recording medium such as a DVD-R to successively form thereon marks of a length corresponding to data with a spacing disposed therebetween. A Q value or the amount of reduction in time causes the rise time of laser irradiation to be delayed with respect to the scheduled rise time at least after a spacing equal in length to the mark of the shortest length employed for recording. The Q value satisfies the following equation (1) expressed in terms of the relationship between the recording speed n and an asymmetry. That is, $$(0.54 \times \text{Asymmetry} - 1.1)/n \leq Q \leq (0.54 \times \text{Asymmetry} - 0.1)/n \qquad (1)$$

where the asymmetry is the ratio of an amplitude of the shortest mark to that of the longest mark of the recorded marks.

10 Claims, 8 Drawing Sheets

OPTICAL RECORDING MEDIUM, OPTICAL RECORDING DEVICE AND OPTICAL RECORDING METHOD

BACKGROUND OF THE INVENTION

1. Field of the Invention

The present invention relates to an optical recording medium such as a DVD-R, and to a device and method for optical recording information onto the optical recording medium.

2. Detailed Description of the Related Art

In a high density optical recording medium such as a DVD-R, laser pulses are directed to the recording layer, made of organic dye or the like, in response to data to be recorded thereon such that marks having a length corresponding to the data are successively formed with a spacing disposed between the marks. To accomplish high density recording on such an optical recording medium, it is necessary to reduce the marks and the spacing disposed therebetween as much as possible.

Laser pulses are directed to the recording layer at a predetermined recording speed as mentioned above. The energy of the laser pulses is accumulated in the marks adjacent to each other along the direction of recording and a spacing disposed therebetween, causing thermal interference between a mark and the spacing.

For example, to avoid the thermal interference, the conventional DVD-R recording methods (strategies) include dividing laser pulses, directed to a DVD-R to form marks thereon, into a top pulse having a large pulse width and multi-pulses repeated at short time intervals, thereby preventing heat from being accumulated upon completion of irradiation of the laser pulses.

In addition to this, the recording strategy is changed because of the following reasons to thereby control the thermal interference.

For example, consider two combinations: a combination of a mark, a long spacing, and a mark; another combination of a mark, a short spacing, and a mark. In these cases, recording these combinations by the same recording strategy would cause different amounts of heat to be accumulated in each mark and different recording mark lengths to be produced in the same duration of laser pulse irradiation due to the difference in length of spacings disposed between the recording marks. This would ultimately lead to a difference in total jitter. Here, the total jitter means the jitter of a recording mark/spacing produced along the time axis and normalized with channel clocks.

Suppose that a mark has been formed and is followed by a short spacing. In this case, the amount of heat generated during the formation of the mark would affect the mark subsequent to the spacing, resulting in an elongated mark and a shortened spacing.

In the case of a DVD-R, such a thermal interference has a serious effect on a combination of a 3T spacing disposed between marks, the spacing having 3T (3 channel bit length) equal in length to the shortest mark of the DVD.

For this reason, such a recording strategy has been conventionally employed for recording in which the start of a laser top pulse subsequent to a predetermined short spacing is delayed so as to shorten the length of an emitted pulse than in other cases.

The mark subsequent to a 3T spacing or the shortest spacing would be seriously affected by the thermal interference. Therefore, such a laser pulse delay time for shortening the length of the mark and the amount of time reduction Q(ns) after the 3T spacing are effective to prevent total jitter.

As described above, Q can be used to form a mark subsequent at least to a spacing equal in length to the shortest mark provided for recording. In any combinations of a mark, the shortest spacing, and a mark or of a mark, a long spacing, and a mark, this allows the lengths of the last marks (or spacings) to be aligned with each other irrespective of the length of the spacings, thereby reducing the total jitter.

It has been conventionally practiced upon recording to determine the optimum Q value based on an asymmetry obtained by a signal after the recording or on a fixed value employed for roughly expecting the power of the asymmetry. However, different recorders provide different expectation values and thus provide different asymmetries upon recording the same optical recording medium, thereby making it impossible to determine the optimum Q value in a fixed manner.

SUMMARY OF THE INVENTION

The present invention has been developed in view of the aforementioned conventional problems. It is therefore an object of the present invention to provide an optical recording method, an optical recording device, and an optical recording medium which find the relationship between the asymmetry (recording power) and the optimum Q value affected greatly by the asymmetry to provide total jitter controlled in a good manner.

The inventor has made intensive studies on optical recording methods, optical recording devices, and optical recording media. Consequently, the inventor found it possible to provide the optimum Q value at least after a spacing equal in length to the shortest mark employed for recording by controlling the value in response to the power and the recording speed of the laser beam upon recording.

Accordingly, the aforementioned object can be accomplished with the present invention described below.

(1) An optical recording method for successively forming and thereby recording marks with a spacing disposed therebetween by directing a laser beam in response to data at a predetermined recording speed onto a recording layer of an optical recording medium, the marks having a length corresponding to the data to be recorded, the optical recording medium comprising at least the recording layer and an optical reflective layer on an optical transparent substrate, the method comprising the step of: controlling, in response to a power and a recording speed of the laser beam upon recording, an amount of time reduction for delaying a start time of a laser beam irradiation with respect to a scheduled start time to shorten duration of the laser beam irradiation at least after the spacing equal in length to a shortest mark employed for recording.

(2) An optical recording method for successively forming and recording marks with a spacing disposed therebetween by directing a laser beam in response to data at a predetermined recording speed n onto a recording layer of an optical recording medium, the marks having a length corresponding to the data to be recorded, the optical recording medium comprising at least the recording layer and an optical reflective layer on an optical transparent substrate, wherein an amount of time reduction Q(ns) for delaying a start time of a laser beam irradiation with respect to a scheduled start time to shorten duration of the laser beam irradiation at least after the spacing equal in length to a shortest mark employed for recording, the recording speed n, and an asymmetry satisfy the following equation (1), $$(0.54\times \text{Asymmetry}-1.1)/n \leq Q \leq (0.54\times \text{Asymmetry}-0.1)/n \qquad (1)$$

where the asymmetry is a ratio of an amplitude of the shortest mark to that of a longest mark of recorded marks and has a value of 0% or greater.

(3) An optical recording device for successively forming and recording marks with a spacing disposed therebetween by directing a laser beam in response to data at a predetermined recording speed onto a recording layer of an optical recording medium, the marks having a length corresponding to the data to be recorded, the optical recording medium comprising at least the recording layer and an optical reflective layer on an optical transparent substrate, wherein an amount of time reduction for delaying a start time of a laser beam irradiation with respect to a scheduled start time to shorten duration of the laser beam irradiation at least after the spacing equal in length to a shortest mark employed for recording is controlled in response to values of a power and the recording speed of the laser beam upon recording.

(4) An optical recording device for successively forming and recording marks with a spacing disposed therebetween by directing a laser beam in response to data at a predetermined recording speed n onto a recording layer of an optical recording medium, the marks having a length corresponding to the data to be recorded, the optical recording medium comprising at least the recording layer and an optical reflective layer on an optical transparent substrate, wherein an amount of time reduction Q(ns) for delaying a start time of a laser beam irradiation with respect to a scheduled start time to shorten duration of the laser beam irradiation at least after the spacing equal in length to a shortest mark employed for recording, the recording speed n, and an asymmetry satisfy the following equation (1), $$(0.54\times \text{Asymmetry}-1.1)/n \leq Q \leq (0.54\times \text{Asymmetry}-0.1)/n \qquad (1)$$

where the asymmetry is a ratio of an amplitude of the shortest mark to that of a longest mark of recorded marks and has a value of 0% or greater.

(5) An optical recording medium for successively forming and recording marks thereon with a spacing disposed therebetween by directing a laser beam in response to data at a predetermined recording speed n onto a recording layer of the optical recording medium comprising at least the recording layer made of dye and an optical reflective layer on an optical transparent substrate, the marks having a length corresponding to the data to be recorded, wherein an amount of time reduction Q(ns) for delaying a start time of a laser beam irradiation with respect to a scheduled start time to shorten duration of the laser beam irradiation at least after the spacing equal in length to a shortest mark employed for recording, the recording speed n, and an asymmetry satisfy the following equation (1), $$(0.54\times \text{Asymmetry}-1.1)/n \leq Q \leq (0.54\times \text{Asymmetry}-0.1)/n \qquad (1)$$

where the asymmetry is a ratio of an amplitude of the shortest mark to that of a longest mark of recorded marks and has a value of 0% or greater.

(6) An optical recording medium according to (5), in which an optical constant k of the dye is 0.01 to 0.1 at a write frequency of the laser beam.

(7) An optical recording medium for successively forming and recording marks thereon with a spacing disposed therebetween by directing a laser beam in response to data at a predetermined recording speed n onto a recording layer of the optical recording medium comprising at least the recording layer and an optical reflective layer on an optical transparent substrate, the marks having a length corresponding to the data to be recorded, wherein information on the optical strategy is pre-recorded on a pre-recorded region, and the optical strategy is the method comprising the step of: controlling, in response to a power and a recording speed of the laser beam upon recording, an amount of time reduction for delaying a start time of a laser beam irradiation with respect to a scheduled start time to shorten duration of the laser beam irradiation at least after the spacing equal in length to a shortest mark employed for recording.

(8) The optical recording medium according to (7), in which the optical recording medium is provided with a plurality of grooves disposed at a predetermined pitch in the width direction, a land is disposed between the grooves in parallel to the grooves, and the pre-recorded region includes at least one of a groove wobbling formed by wobbling the grooves at a predetermined amplitude and space frequency and an isolated pit disposed on top of the land in accordance with a pre-specified rule.

(9) An optical recording medium for successively forming and recording marks thereon with a spacing disposed therebetween by directing a laser beam in response to data at a predetermined recording speed n onto a recording layer of the optical recording medium comprising at least the recording layer and an optical reflective layer on an optical transparent substrate, the marks having a length corresponding to the data to be recorded, wherein information on the optical strategy is pre-recorded on a pre-recorded region, and in the optical strategy, an amount of time reduction Q(ns) for delaying a start time of a laser beam irradiation with respect to a scheduled start time to shorten duration of the laser beam irradiation at least after the spacing equal in length to a shortest mark employed for recording, the recording speed n, and an asymmetry satisfy the following equation (1), $$(0.54\times \text{Asymmetry}-1.1)/n \leq Q \leq (0.54\times \text{Asymmetry}-0.1)/n \qquad (1)$$

where the asymmetry is a ratio of an amplitude of the shortest mark to that of a longest mark of recorded marks and has a value of 0% or greater.

(10) The optical recording medium according to (9), wherein the optical recording medium is provided with a plurality of grooves disposed at a predetermined pitch in a width direction, a land is disposed between the grooves in parallel to the grooves, and the pre-recorded region includes at least one of a groove wobbling formed by wobbling the grooves at a predetermined amplitude and space frequency and an isolated pit disposed on top of the land in accordance with a pre-specified rule.

In the present invention, the optimum Q value at least after a spacing equal in length to the shortest mark employed for recording is controlled in accordance not only with the combination of record marks and a spacing but also with the recording power and speed upon recording. Furthermore, the relationship between an asymmetry or the ratio of the amplitude of the shortest recording mark to that of the longest recording mark and the Q value is defined, thereby giving the equation that provides good total jitter.

In the equation, n is expressed in [(channel bit length)× (channel bit rate upon recording)]/reference speed, and the reference speed is equal to channel bit length ×reference channel bit rate.

For a DVD, the channel bit length is 0.133 μm, and the channel bit rate is 26.16MHz.

These and other objects, features and advantages of the present invention will become more apparent upon a reading of the following description and appended drawings.

BRIEF DESCRIPTION OF THE DRAWINGS

These and other objects and advantages of the present invention will become clear from the following description with reference to the accompanying drawings, wherein.

PREFERRED EMBODIMENTS OF THE INVENTION

Now, the present invention will be explained below in more detail with reference to the accompanying drawings in accordance with the embodiments.

Figure 1:
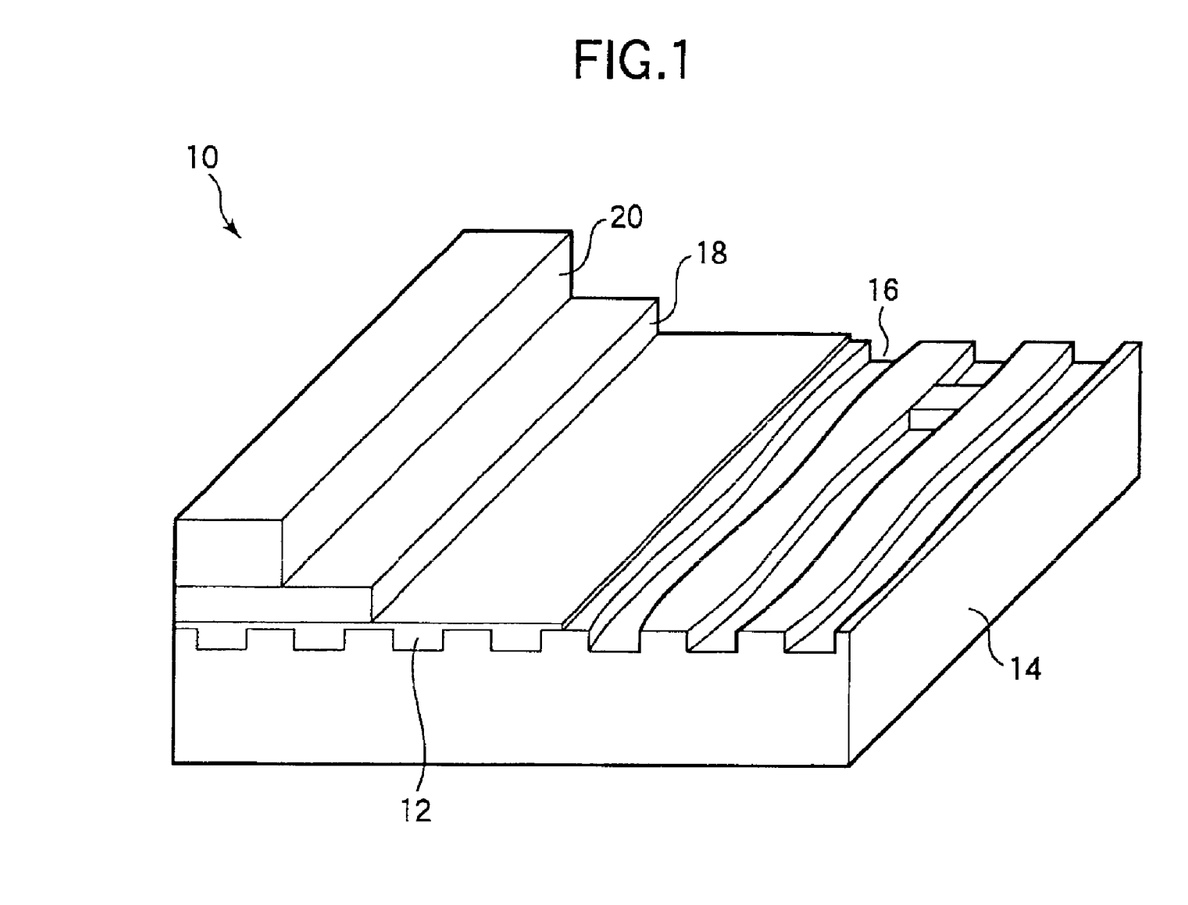
FIG. 1 is a partially exploded perspective view illustrating the main portion of an optical recording medium according to an embodiment of the present invention.

As shown in FIG. 1, an optical recording medium 10 according to an embodiment of the present invention is a DVD-R having a recording layer 12 made of dye, and comprises a substrate 14 made of a transparent base material. The optical recording medium 10 also comprises the recording layer 12 made of the dye that is applied to cover grooves 16. The grooves 16 are formed on a surface of the substrate 14 (on the upper surface in FIG. 1) to guide a laser beam. the optical recording medium 10 further comprises a reflective film 18 that is made of gold, silver, aluminum or the like and formed on top of the recording layer 12 through sputtering or the like, and a protective layer 20 for covering the outer surface of the reflective film 18.

The recording layer 12 is made of an organic dye, having an optical constant k of 0.01 to 0.1, such as poly methine cyanine or metal azo complex dye. The substrate 14 is made of polycarbonate or polyolefin macromolecular polymer.

Figure 2:
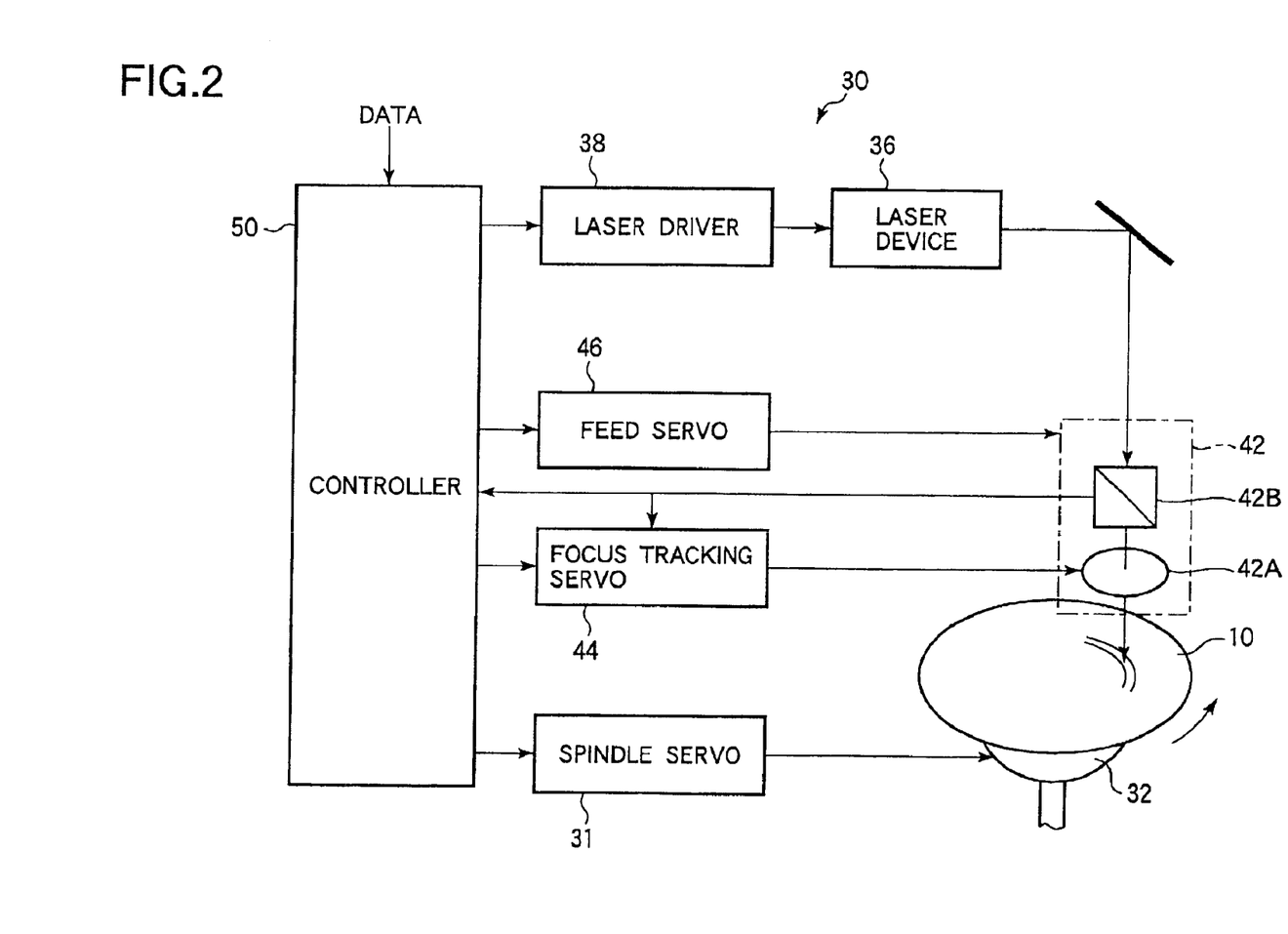
FIG. 2 is a block diagram illustrating an optical recording device for implementing an optical recording method according to an embodiment of the present invention.

An optical recording device 30 shown in FIG. 2 performs optical recording operations on the optical recording medium 10.

The optical recording device 30, a DVD-R recorder in this embodiment, actuates a spindle motor 32 via a spindle servo 31 to rotate the optical recording medium (DVD-R disk) 10 at a constant recording rate n. The optical recording device 30 then allows a laser device 36 to emit a laser beam directed to the recording layer 12 corresponding to data being recorded, thereby successively forming marks (recording marks) having a length corresponding to the data with a spacing disposed therebetween.

The laser device 36 emits a controlled number of laser pulses according to the data to be recorded, the number of laser pulses being controlled by a laser driver 38.

There is provided a recording optical system, shown generally by reference numeral 42 in FIG. 2, which includes an objective lens 42A and a half mirror 42B. The objective lens 42A is subjected to focus tracking control in a manner such that a focus tracking servo 44 allows the laser beam to be focused on the recording layer 12. In addition, the objective lens 42A and the half mirror 42B are subjected to the control of a feed servo 46 so as to move from the inner to the outer circumference in synchronization with the rotation of the optical recording medium 10.

The spindle servo 31, the laser driver 38, the focus tracking servo 44, and the feed servo 46 are controlled by a controller 50. The data (information) to be recorded on the recording layer 12 is delivered to the controller 50.

Now, explained below is a recording strategy of optical recording data onto the optical recording medium 10 or a DVD-R using the optical recording device 30.

Figure 3:
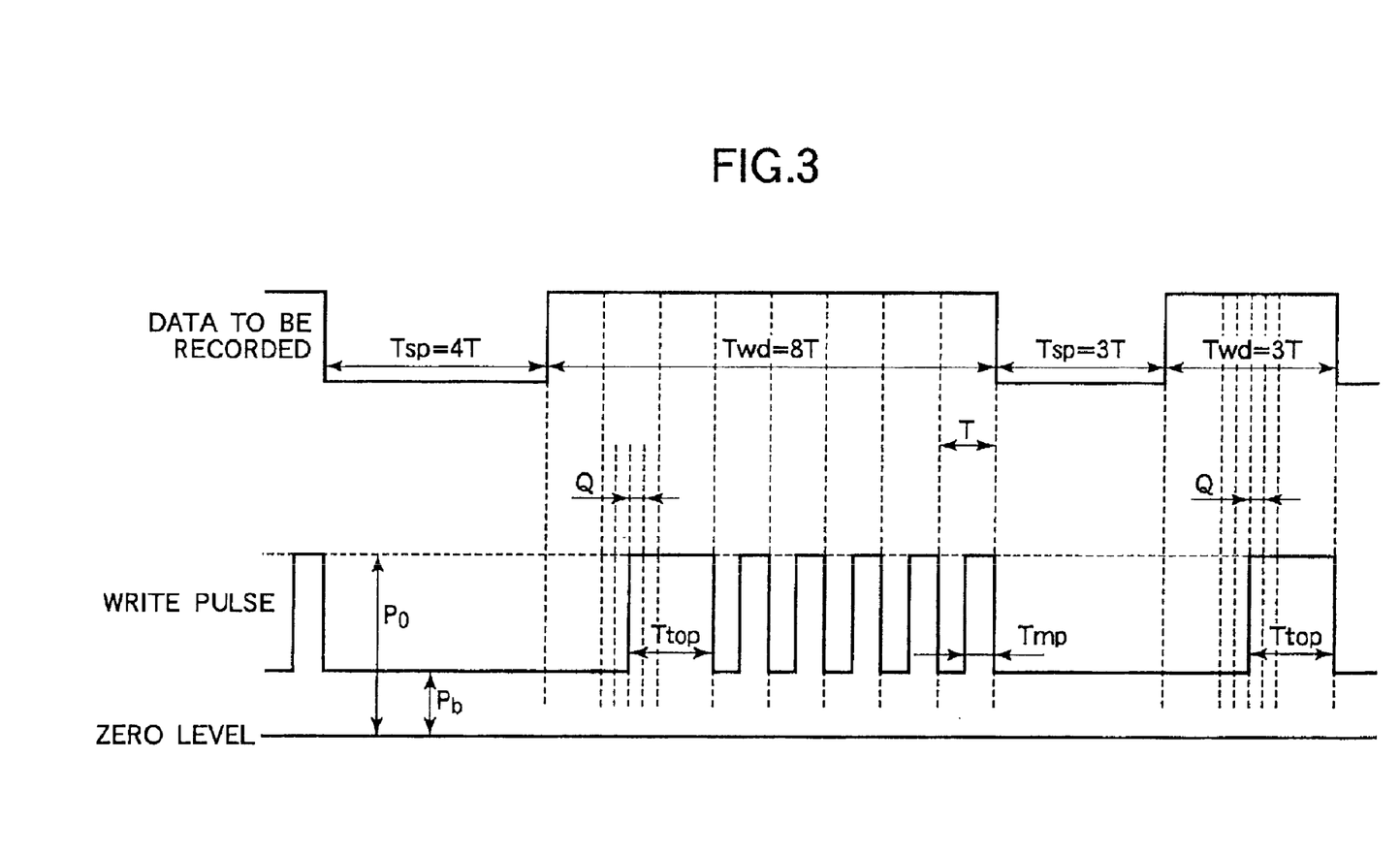
FIG. 3 is a diagram illustrating a recording strategy employed for the optical recording method according to the present invention.

In principle, as shown in FIG. 3, this recording strategy is designed as follows. That is, the laser device 36 is activated so as to launch a top pulse Ttop having an elongated duration in time upon initiating the recording of the data to be recorded, followed by multi-pulses (of a pulse width Tmp) repeated at short time intervals. For example, as shown at the center in FIG. 3, suppose that the data to be recorded Twd is equal to 8T. In this case, the recording strategy is performed using multi-pulses consisting of the top pulse Ttop and five pulses (of Tmp) repeated at short time intervals.

On the other hand, to record the shortest data of 3T, the recording strategy is performed using only the top pulse Ttop.

To form a mark of 3T or data of 3T, the preceding spacing Tsp is set at 3T only in this case.

In FIG. 3, it is seen that the start of the top pulse Ttop is delayed with respect to that of the data to be recorded. This is to avoid generating excessive heat due to the presence of the heat accumulated as described above.

In practice, the start of the top pulse Ttop is delayed by Q(ns) with respect to the scheduled timing that is shown by the solid line in FIG. 3.

The value of Q after the spacing of 3T is operated in the controller 50 as follows, and then controlled via the laser driver 38.

In this embodiment, the relationship between the optimum asymmetry and the optimum Q value after the spacing of 3T is defined by the following equation (1) to provide a good total jitter. That is, $$(0.54 \times \text{Asymmetry} - 1.1)/n \leq Q \leq (0.54 \times \text{Asymmetry} - 0.1)/n \quad (1)$$

where n is the recording speed. At n=1 or normal speed, the recording speed is equal to 3.49m/s, while at n=2 or double speed, the recording speed is 6.98m/s. The asymmetry represents the ratio of the amplitude of the shortest mark to that of the longest mark (spacing), shown by the following equation (2) according to the DVD standards. That is, $$\text{Asymmetry}=[(I14H+I14L)-(I3H+I3L)/[2*(I14H-I14L)]*100 \quad (2).$$

Figure 4:
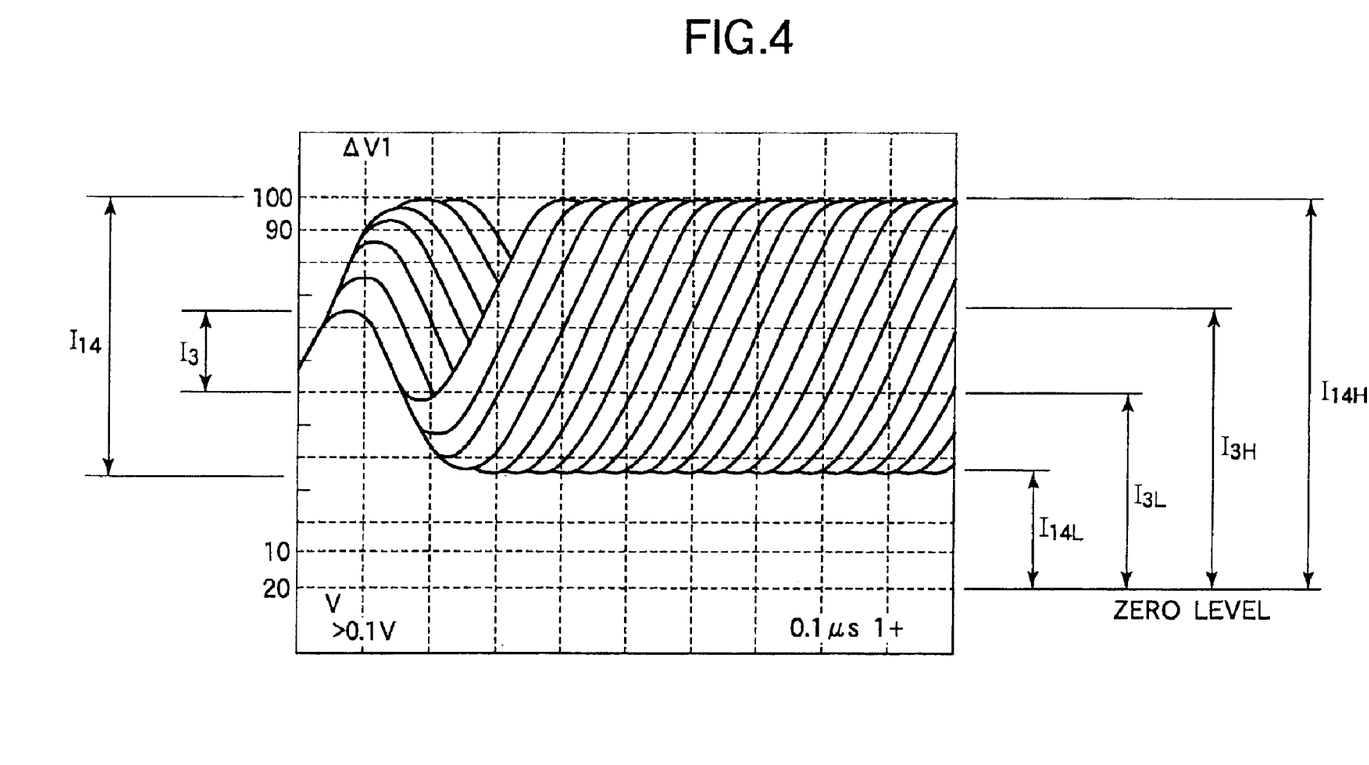
FIG. 4 is a diagram illustrating the definition of variables in an equation for an asymmetry employed for the optical recording method according to the present invention.

In the above equation (2), it is assumed that I14 is the amplitude width of the read signal for reading the longest mark and I3 is the amplitude width of the read signal for reading the shortest mark. Then, as shown in FIG. 4, by definition, I14 has the peak height of I14H and the lowest height of I14L, while I3 has the peak height of I3H and the lowest height of I3L, each being measured from the zero level.

Figure 5:
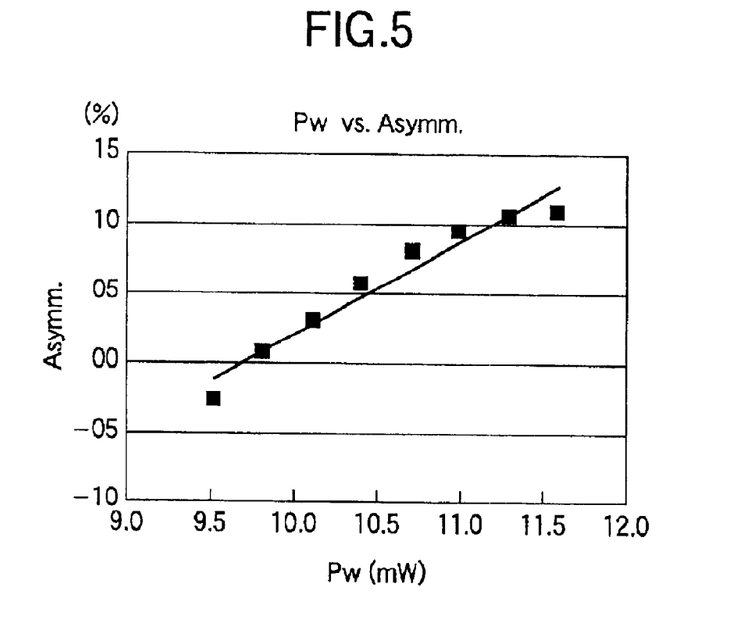
FIG. 5 is a diagram illustrating the relationship between the asymmetry and the power of laser beams provided for optical recording operations.

As shown in FIG. 5, the asymmetry and the power of the light emitted from the laser device 36 are generally proportional to each other irrespective of the recording speed (excluding the region of the saturated amplitude of I14).

The preferably asymmetry is 0 to 12% and more preferably on the order of 0 to 10%.

The slope of the graph shown in FIG. 5 may conceivably be varied or offset due to the thermal conductivity of the material of the recording layer 12, the thickness and thermal conductivity of the reflective film 18, the amount of heat generated upon decomposition of the dye of the recording layer 12 upon recording (when irradiated with a laser beam) and so forth. However, in practice, the asymmetry and the power of the laser beam are always proportional to each other. This proportionality is hardly dependent on the value of Q which has been mentioned above.

Here, in the equation (1), the recording speed n is the reference speed of 3.49m/s at n=1 (1T=38.15ns upon recording at normal speed).

Figure 6:
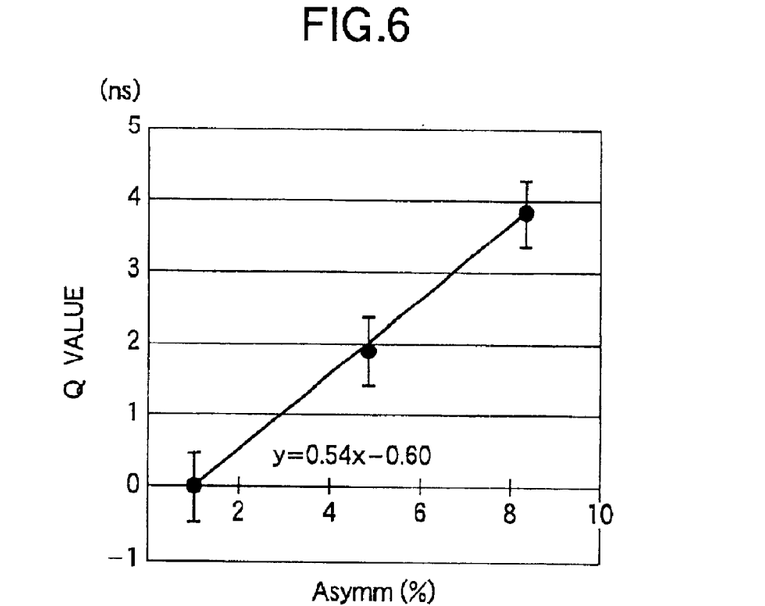
FIG. 6 is a diagram illustrating the relationship between the Q value and the asymmetry, employed to derive the aforementioned equation.
Figure 7:
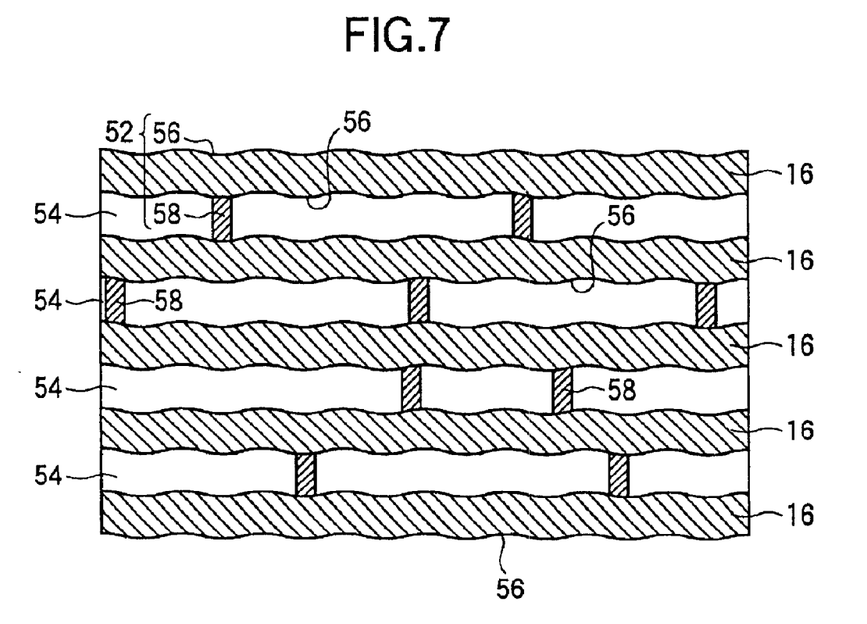
FIG. 7 is a diagram illustrating the relationship between the asymmetry, the total jitter, and the Q value.

The equation (1) shown above has been derived from the relationships between the Q value and the asymmetry, and between the total jitter, the asymmetry, and the Q value, as shown in FIGS. 6 and 7.

It is necessary to pre-record the information on the recording strategy onto the optical recording medium 10 before the medium is optical recorded. The information may be recorded on the pre-recorded region 52 shown in FIG. 8.

Figure 8:
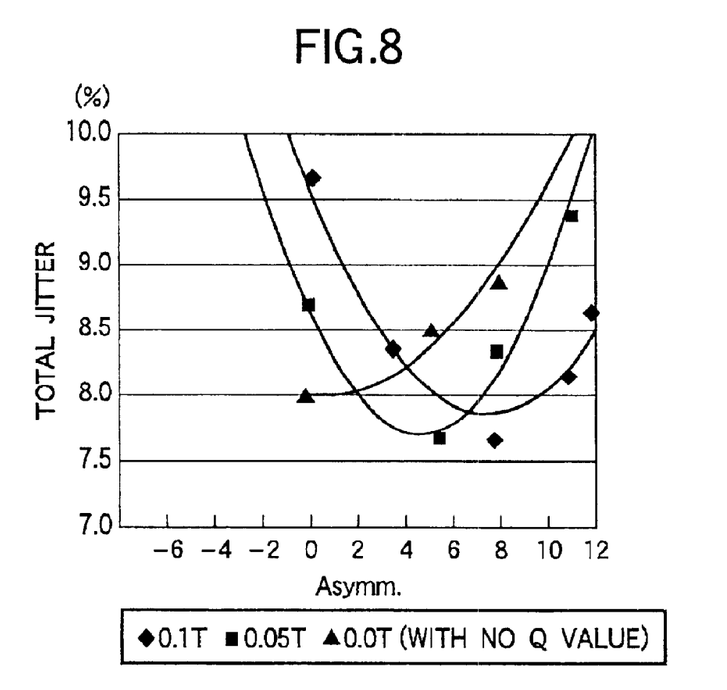
FIG. 8 is an enlarged schematic view illustrating a pre-recorded region where information on the recording strategy according to the method of the present invention is pre-stored on the optical recording medium.

That is, the optical recording medium is provided with the plurality of grooves 16 at a predetermined pitch in their width direction. Between the grooves 16, lands 54 are disposed in parallel to the grooves 16. The pre-recorded region 52 includes one of or both a wobbling portion 56 and an isolated pit 58, where information on the recording strategy is pre-recorded. Here, the wobbling portion 56 is formed by wobbling the groove 16 at a predetermined amplitude and space frequency, and the isolated pit 58 is disposed on top of the land 54 in accordance with a pre-specified rule.

The above equation (1) was derived through the following example and comparative example.

EXAMPLE AND COMPARATIVE EXAMPLE

An optical recording medium that was compatible with the General Standards for DVD-R's was used for recording at normal speed (n=1).

The Asymmetry (hereinafter referred to as Asymm.) and Q value were varied to measure deviations in the total jitter, the marks after 3T spacing (3T to 11T and 14T), and all marks.

The recording strategy was employed so that 3Ttop is 1.65T, 4Ttop is 1.65T, Ttop after 5T is 1.70T, and Tmp is 0.7T.

Figure 9:
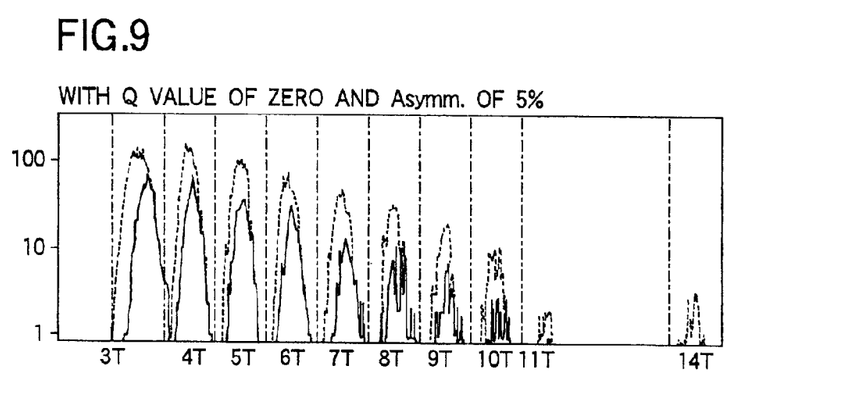
FIG. 9 is a diagram illustrating the relationship between the marks of 3T to 14T after the spacing of 3T and all marks in terms of optical reflectivity along time axis with the Q value being equal to 0 and the asymmetry being equal to 5%.
Figure 10A:
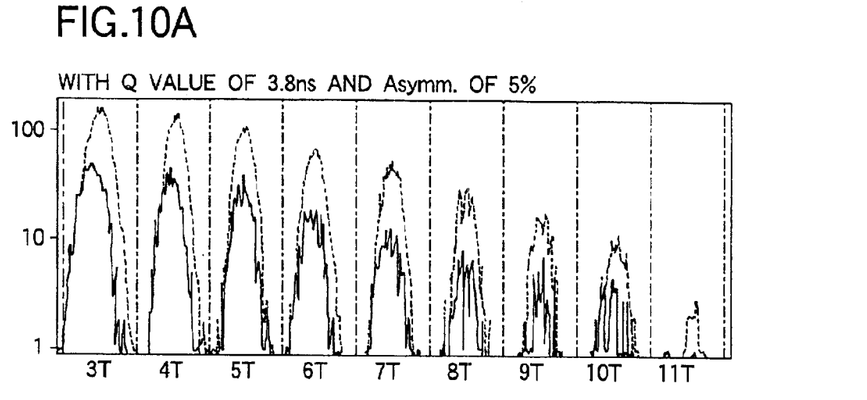
FIG. 10(A) is the same diagram as FIG. 9, with the asymmetry being equal to 5% and the Q value being equal to +0.10T.
Figure 10B:
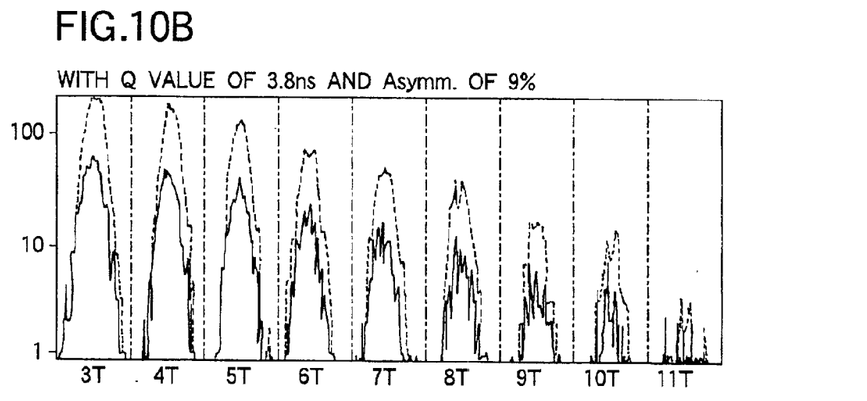
FIG. 10(B) is the same diagram as FIG. 9, with the asymmetry being equal to 9% and the Q value being equal to +0.10T.
Figure 11A:
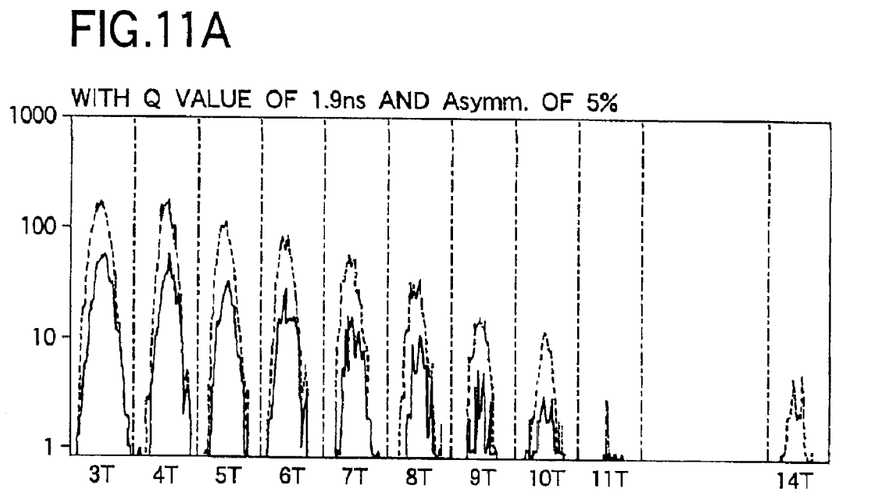
FIG. 11(A) is the same diagram as FIG. 9, with the asymmetry being equal to 6% and the Q value being equal to +0.50T.
Figure 11B:
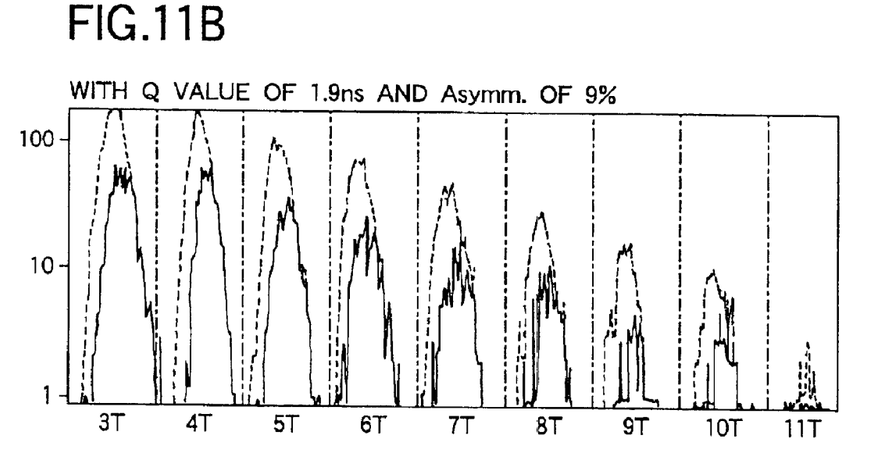
FIG. 11(B) is the same diagram as FIG. 9, with the asymmetry being equal to 10% and the Q value being equal to +0.50T.

In FIGS. 9 to 11, the vertical axis represents the frequency of the marks formed and the horizontal axis represents time at each point such as 3T mark and 4T mark. The solid line represents each mark and the dashed line represents the case of all marks. The frequency of the marks has a Gaussian distribution preferably with a reduced standard deviation and a reduced shift of a mark (solid line) after a 3T spacing with respect to all marks (dashed line).

1. The reference recording speed was set at 3.49m/s and the laser power was adjusted such that the Asymm. was 5% to perform recording with the Q value of the write signal after a 3T spacing being changed.

The results were +1.6ns (+0.042T), +2.1ns (+0.055T), and +2.6ns (+0.068T), at an Asymm. of 5%.

As shown in FIG. 9 and Table 1, at the Q value equal to zero, the comparison between the 3T mark (solid line) after a 3T spacing and all marks (dashed line) tells that the 3T mark after a 3T spacing is selectively shifted toward the longer side with respect to all marks. The total jitter was found to be 8.4% because of an increased heat accumulation under these conditions as mentioned above and a shortened 3T spacing caused by the absence of a Q value (see FIG. 9).

At the Q value equal to +0.05T (=1.9ns), the lengths of the 3T mark after a 3T spacing and all marks generally match with each other, with the total jitter being equal to 7.7% (FIG. 11(A)).

At the Q value equal to +0.06T (=2.3ns), the lengths of the 3T mark after a 3T spacing and all marks generally match with each other, with the total jitter being equal to 7.6%.

At the Q value equal to +0.10T (=3.8ns), the comparison between the 3T mark after a 3T spacing and all marks tells that the 3T mark after a 3T spacing is selectively shifted toward the shorter side with respect to all marks. This is because of a decreased-heat accumulation under these conditions and a shortened 3T spacing after a 3T spacing caused by an elongated Q value. The total jitter was found to be 8.2% (FIG. 10(A)).

2. The reference recording speed was set at 3.49m/s and the laser power was adjusted such that the Asymm. was 9% to perform recording with the Q value of the write signal after a 3T spacing being changed.

The results were +3.8ns (+0.10T), +4.3ns (+0.11T), and +4.8ns (+0.13T), at an Asymm. of 9%.

At the Q value equal to +0.05T (=1.9ns), the comparison between the 3T mark (solid line) after a 3T spacing and all marks (dashed line) tells that the 3T mark after a 3T spacing is selectively shifted toward the longer side with respect to all marks. This shift took place because of the aforementioned heat accumulation. The total jitter was found to be 8.5% (FIG. 11(B)).

At the Q value equal to +0.10T (=3.8ns), the lengths of the 3T mark after a 3T spacing and all marks generally match with each other, with the total jitter being equal to 7.8% (FIG. 10(B)).

At the Q value equal to +0.12T (=+4.6ns), the lengths of the 3T mark after a 3T spacing and all marks generally match with each other, with the total jitter being equal to 8.0%.

At the Q value equal to +0.15T (=+5.7ns), the comparison between the 3T mark after a 3T spacing and all marks tells that the 3T mark after a 3T spacing is selectively shifted toward the shorter side with respect to all marks. This is because of a decreased heat accumulation under these conditions and a shortened 3T spacing after a 3T spacing caused by an elongated Q value. The total jitter was found to be 9.8%.

3. The reference recording speed was set at 3.49m/s and the laser power was adjusted such that the Asymm. was 0% to perform recording with the Q value of the write signal after a 3T spacing being changed.

At the Q value equal to −0.02T, the lengths of the 3T mark after a 3T spacing and all marks generally match with each other, with the total jitter being equal to 8.0%.

At the Q value equal to −0.01T, the lengths of the 3T mark after a 3T spacing and all marks generally match with each other, with the total jitter being equal to 8.0%.

At the Q value equal to 0.03T (=+1.1ns), the comparison between the 3T mark after a 3T spacing and all marks tells that the 3T mark after a 3T spacing is selectively shifted toward the shorter side with respect to all marks. This is because of a decreased heat accumulation under these conditions and a shortened 3T spacing after a 3T spacing caused by an elongated Q value. The total jitter was found to be 8.3%.

At the Q value equal to 0.05T (=+1.9ns), the comparison between the 3T mark after a 3T spacing and all marks tells that the 3T mark after a 3T spacing is selectively shifted toward the shorter side with respect to all marks. This is because of a decreased heat accumulation under these conditions and a shortened 3T spacing after a 3T spacing caused by an elongated Q value. The total jitter was found to be 8.7%.

From the results in the foregoing, the relationship between the optimum Q value and Asymm., which gives a target total jitter value, is derived in the form of the aforementioned equation (1). (Here, the target total jitter value of 8.0% or less was defined as an acceptable result.)

To measure the total jitter values and the mark lengths, TA320 made by Yokogawa Electric Corporation was employed as a measuring device. The asymmetry was measured using an analog oscilloscope made by Iwatsu Electric Co., Ltd.

The foregoing results are summarized in Table 1.

TABLE 1

| — | | Q value (ns) | Total Jitter | Drawing referenced |
|---|---|---|---|---|
| Asymm 5% | Q value Range | (T): 0.42T~0.68T (ns): 1.60~2.60 | | |
| | 0T | 0.0 | 8.4 | FIG. 9 |
| | 0.05T | 1.9 | 7.7 | FIG. 11(A) |
| | 0.06T | 2.3 | 7.6 | FIG. 11(B) |
| | 0.1T | 3.8 | 8.2 | FIG. 10(A) |
| Asymm 9% | Q value Range | (T): 0.099T~0.125T (ns): 3.76~4.76 | | |
| | 0.05T | 1.9 | 8.5 | FIG. 11(B) |
| | 0.1T | 3.8 | 7.8 | FIG. 10(B) |
| | 0.12T | 4.6 | 8 | |
| | 0.15T | 5.7 | 9.8 | |
| Asymm 0% | Q value Range | (T): −0.029T~−0.003T (ns): −1.1~−0.1 | | |
| | −0.02T | −0.8 | 8 | |
| | −0.01T | 0.4 | 8 | |
| | 0.03T | 1.1 | 8.3 | |
| | 0.05T | 1.9 | 8.7 | |

The present invention, configured as described above, allows an optimum Q value to be obtained at least after a spacing equal in length to the shortest mark employed for recording, thereby realizing an improved effect of reducing the total jitter.

Having now fully described the invention, it will be apparent to one of ordinary skill in the art that many changes and modifications can be made thereto without departing from the spirit and scope of the invention as set forth herein.

What is claimed is:

1. An optical recording method for successively forming and thereby recording marks with a spacing disposed therebetween by directing a laser beam in response to data at a predetermined recording speed onto a recording layer of an optical recording medium, the marks having a length corresponding to the data to be recorded, the optical recording medium comprising at least the recording layer and an optical reflective layer on an optical transparent substrate, the method comprising the step of:

controlling, in response to a power and a recording speed of the laser beam upon recording, an amount of time reduction for delaying a start time of a laser beam irradiation with respect to a scheduled start time to shorten duration of the laser beam irradiation at least after the spacing equal in length to a shortest mark employed for recording.

2. An optical recording method for successively forming and recording marks with a spacing disposed therebetween by directing a laser beam in response to data at a predetermined recording speed n onto a recording layer of an optical recording medium, the marks having a length corresponding to the data to be recorded, the optical recording medium comprising at least the recording layer and an optical reflective layer on an optical transparent substrate, the method comprising:

delaying a start time of a laser beam irradiation for an amount of time reduction Q(ns) with respect to a scheduled start time to shorten duration of the laser beam irradiation at least after the spacing equal in length to a shortest mark employed for recording, the recording speed n, and an asymmetry satisfy the following equation (1), $(0.54 \times \text{Asymmetry} - 1.1)/n \leq Q \leq (0.54 \times \text{Asymmetry} - 0.1)/n$ (1) where the asymmetry is a ratio of an amplitude of the shortest mark to that of a longest mark of recorded marks and has a value of 0% or greater.

3. An optical recording device for successively forming and recording marks with a spacing disposed therebetween by directing a laser beam in response to data at a predetermined recording speed onto a recording layer of an optical recording medium, the marks having a length corresponding to the data to be recorded, the optical recording medium comprising at least the recording layer and an optical reflective layer on an optical transparent substrate, the optical recording device comprising:

a controller to delay a start time of a laser beam irradiation for an amount of time reduction with respect to a scheduled start time to shorten duration of the laser beam irradiation at least after the spacing equal in length to a shortest mark employed for recording is controlled in response to values of a power and the recording speed of the laser beam upon recording.

4. An optical recording device for successively forming and recording marks with a spacing disposed therebetween by directing a laser beam in response to data at a predetermined recording speed n onto a recording layer of an optical recording medium, the marks having a length corresponding to the data to be recorded, the optical recording medium comprising at least the recording layer and an optical reflective layer on an optical transparent substrate, the optical recording device comprising:

a controller to delay a start time of a laser beam irradiation for an amount of time reduction Q(ns) with respect to a scheduled start time to shorten duration of the laser beam irradiation at least after the spacing equal in length to a shortest mark employed for recording, the recording speed n, and an asymmetry satisfy the following equation (1), $(0.54 \times \text{Asymmetry} - 1.1)/n \leq Q \leq (0.54 \times \text{Asymmetry} - 0.1)/n(1)$ where the asymmetry is a ratio of an amplitude of the shortest mark to that of a longest mark of recorded marks and has a value of 0% or greater.

5. An optical recording medium for successively forming and recording marks thereon with a spacing disposed therebetween by directing a laser beam in response to data at a predetermined recording speed n onto a recording layer of the optical recording medium comprising at least the recording layer made of dye and an optical reflective layer on an optical transparent substrate, the marks having a length corresponding to the data to be recorded, wherein an amount of time reduction Q(ns) for delaying a start time of a laser beam irradiation with respect to a scheduled start time to shorten duration of the laser beam irradiation at least after the spacing equal in length to a shortest mark employed for recording, the recording speed n, and an asymmetry satisfy the following equation (1), $(0.54 \times \text{Asymmrtry} - 1.1)n \leq Q \leq (0.54 \times \text{Asymmetry} - 0.1)/n(1)$ where the asymmetry is a ratio of an amplitude of the shortest mark to that of a longest mark of recorded marks and has a value of 0% or greater.

6. The optical recording medium according to claim 5, wherein an optical constant k of the dye is 0.01 to 0.1 at a write frequency of the laser beam.

7. An optical recording medium for successively forming and recording marks thereon with a spacing disposed therebetween by directing a laser beam in response to data at a predetermined recording speed n onto a recording layer of the optical recording medium comprising at least the recording layer and an optical reflective layer on an optical transparent substrate, the marks having a length corresponding to the data to be recorded, wherein information on the optical strategy is pre-recorded on a pre-recorded region, and the optical strategy is the method comprising the step of:

controlling, in response to a power and a recording speed of the laser beam upon recording, an amount of time reduction for delaying a start time of a laser beam irradiation with respect to a scheduled start time to shorten duration of the laser beam irradiation at least after the spacing equal in length to a shortest mark employed for recording.

8. The optical recording medium according to claim 7, wherein the optical recording medium is provided with a plurality of grooves disposed at a predetermined pitch in a width direction, a land is disposed between the grooves in parallel to the grooves, and the pre-recorded region includes at least one of a groove wobbling formed by wobbling the grooves at a predetermined amplitude and space frequency and an isolated pit disposed on top of the land in accordance with a pre-specified rule.

9. An optical recording medium for successively forming and recording marks thereon with a spacing disposed therebetween by directing a laser beam in response to data at a predetermined recording speed n onto a recording layer of the optical recording medium comprising at least the recording layer and an optical reflective layer on an optical transparent substrate, the marks having a length corresponding to the data to be recorded, wherein information on the optical strategy is pre-recorded on a pre-recorded region, and in the optical strategy, an amount of time reduction Q(ns) for delaying a start time of a laser beam irradiation with respect to a scheduled start time to shorten duration of the laser beam irradiation at least after the spacing equal in length to a shortest mark employed for recording, the recording speed n, and an asymmetry satisfy the following equation (1), $(0.54 \times \text{Asymmetry} - 1.1)/n \leq Q \leq (0.54 \times \text{Asymmetry} - 0.1)n(1)$ where the asymmetry is a ratio of an amplitude of the shortest mark to that of a longest mark of recorded marks and has a value of 0% or greater.

10. The optical recording medium according to claim 9, wherein the optical recording medium is provided with a plurality of grooves disposed at a predetermined pitch in a width direction, a land is disposed between the grooves in parallel to the grooves, and the pre-recorded region includes at least one of a groove wobbling formed by wobbling the grooves at a predetermined amplitude and space frequency and an isolated pit disposed on top of the land in accordance with a pre-specified rule.

* * * * *